United States Patent Office 3,819,611
Patented June 25, 1974

3,819,611
ANTIBIOTIC W847 (MEGALOMICIN) AND
METHODS FOR PRODUCTION THEREOF
Marvin J. Weinstein, East Brunswick, George M. Luedemann, Glen Ridge, Gerald H. Wagman, East Brunswick, and Joseph A. Marquez, Montclair, N.J., assignors to Schering Corporation, Bloomfield, N.J.
No Drawing. Application Sept. 4, 1969, Ser. No. 855,424, now Patent No. 3,632,750, which is a continuation-in-part of application Ser. No. 707,100, Feb. 21, 1968, which in turn is a continuation-in-part of application Ser. No. 641,522, May 26, 1967, both now abandoned. Divided and this application June 25, 1971, Ser. No. 157,030
Int. Cl. C07c *129/18*
U.S. Cl. 260—210 AB         20 Claims

ABSTRACT OF THE DISCLOSURE

A new antibiotic complex identified as Antibiotic W847 Complex, (or Antibiotic W847 or *megalomicin*), composed of at least four major antibiotic components is produced by the cultivation under submerged aerobic conditions of *Micromonospora megalomicea*, a hitherto undescribed species of the genus *Micromonospora* of the order Actinomycetales. The indivdual components are isolated by solvent extraction and chromatography and are characterized by their respective chemical and biologoical properties.

FIELD OF THE INVENTION

This application is a divisional of co-pending application Ser. No. 855,424, filed Sept. 4, 1969, now Pat. No. 3,632,-750, which is a continuation-in-part of application Ser. No. 707,100, filed Feb. 21, 1968 (now abandoned), which is a continuation-in-part of application Ser. No. 641,522, filed May 26, 1967 (now abandoned).

This invention relates to new antibiotics and to methods for their production, isolation, and purification. More specifically, this invention relates to new and useful antibiotics formed by the cultivation under controlled conditions of a hitherto undescribed species of the genus *Micromonospora* of the order Actinomycetales.

DESCRIPTION OF THE INVENTION

The Microorganism

The hitherto undescribed species of the genus *Micromonospora* employed in the production of the new antibiotics of this invention was isolated originally from a soil sample obtained directly from the earth by one of the inventors named herein. Two strains of this *Micromonospora* species have been isolated. These two strains are natural color variants and may be distinguished microscopically by the degree to which sporulation occurs. Cultures of living organisms of these two strains have been deposited and made a part of the stock culture collection of the United States Department of Agriculture, Northern Utilization Research and Development Division, Peoria, Illinois, where they have been designated NRRL 3274 and NRRL 3275. These strains are available from the collection agency upon request. These strains will be referred to hereinafter individually as *Micromonospora sp.* W847 (NRRL 3274) and as *Micromonospora sp.* W847 (NRRL 3275) and collectively as *Micromonospora sp.* W847. These strains are also referred to by applicants as *Micromonospora megalomicea* var *megalomicea* NRRL 3274 and *Micromonospora megalomicea* var *nigra* NRRL 3275, respectively. These names are deemed to be synonymous with those set forth above and may be used interchangeably.

Macroscopic examination of 28 day old cultures (24–26° C.) of *Micromonospora sp.* W847 (NRRL 3274) on Czapek's Sucrose Agar is characterized by good growth exhibiting no aerial mycelium and by raised and plicate colonies of a soft, moist and non-waxy consistency producing no diffusable pigment. The color of the colony surface, described according to the "Descriptive Color Name Dictionary," Taylor, Knoche and Granville, published by the Container Corporation of America, 1950 (USA), together with the color chip number taken from the "Color Harmony Manual," 4th Edition, 1958, published by the same company, is orange m4-la. This color corresponds to the synonym or near synonym, strong orange 50, as found in the National Bureau of Standards Circular No. 553, Nov. 1, 1955, USA (all colony color designations employed hereafter are based upon the same color reference system).

Microscopic examination of the same culture shows a regular mycelium composed of long branched filaments approximately 0.6μ in diameter. Spores are infrequently found.

Macroscopic examination of 28 day old cultures of *Micromonospora sp.* W847 (NRRL 3275), grown on the same medium and under the same conditions described above, is characterized by good growth exhibiting the same gross colony characteristics as the previous strain except for color. The color of the colony surface is black. Microscopically, this culture shows a regular mycelium composed of long branched filaments approximately 0.6μ in diameter. In this strain, however, spores are very abundant and are randomly produced throughout the mycelium. The spores are ovoid to spherical in shape with a 0.7–1.0μ diameter and are dark brown when mature.

Colonies of *Micromonospora sp.* W847 may be further characterized by their growth characteristics on various nutrient media. Table 1 below gives the growth characteristics of *Micromonospora sp.* W847 on some of the more widely used nutrient media. The colony observations were made on 14 day old (24–26° C.) cultures unless otherwise specified.

TABLE 1

Colony characteristics of *Micromonospora sp.* W847 on various media

| | |
|---|---|
| Glucose asparagine agar | Growth poor. |
| Aerobic or anaerobic | Aerobic. |
| Bennett's agar | Growth poor. |
| Emerson's agar | Do. |
| Tomato paste oatmeal agar | Do. |
| Glucose-yeast extract agar | Growth good, raised, finely plicate. |
| Potato slice | Growth poor. |
| Sucrose nitrate agar (Czapek's agar) | Growth good, raised, plicate. |
| Tyrosine agar, observations at 2, 7, and 14 days (After Gordon and Smith J. Bact. 69:147). | Growth fair, crystals poorly dissolved directly under colony, brown diffusible, pigment produced after 3 weeks, diffusible pigment not black or typical of a tyrosine positive as produced by streptomycos. |

*Micromonospora sp.* W847 shows good growth at temperatures between 26 and 37° C. and no growth at 50° C. It is aerobic and does not reduce nitrate to nitrite. This species does not liquify gelatin; does not hydrolyze milk and does not decompose cellulose. No diffusible pigment is produced on peptone-iron agar.

*Micromonospora sp.* W847 shows good growth on carbohydrate media containing 0.5 percent yeast extract base and 1 percent of 1-arabinose, glucose, starch, and sucrose but only fair growth where the carbohydrate source is 1 percent xylose. It grows poorly, if at all, on such media in which the solo carbohydrate source is 1 percent d-arabinose, cellulose, dulcitol, galactose, glycerol, lactose, levulose, melibiose, melisitose, raffinose, rhamnose, ribose, inositol or mannitol.

Further characteristic of *Micromonospora sp. W847* is its ability to utilize nitrogen sources. Colony growth characteristics on typical nitrogen sources, observed after 14 days (24–26° C.) growth, are set forth in Table 2 below.

TABLE 2.—UTILIZATION OF NITROGEN SOURCES

| Nitrogen source plus 1% glucose | Growth characteristics |
| --- | --- |
| 0.5% Difco yeast extract | Growth good, raided, finely plicate. |
| 1.0% NZ amine type A* | Growth fair. |
| 1% asparagine | Growth poor. |
| 1% glutamic acid | Do. |
| 1% ammonium nitrate | Do. |

*Product of Sheffield Chemical Company, Norwich, N.Y.

The antibiotic hereinafter to be described is prepared through utilization of *Micromonospora sp. W847* var. *NRRL 3274* and var. *NRRL 3275*. The instant invention however, is not to be construed as so limited as to exclude the use of other variants of *Micromonospora sp. W847* or mutants thereof produced from this organism by mutating agents such as, for example, high frequency radiation including X-ray and ultraviolet, actinophages and nitrogen mustard. In the following description wherein the process for antibiotic production is elaborated, it is to be understood that the use of the term, *Micromonospora sp. W847*, is intended to include the color variants specifically described above as well as all other fully equivalent variants and mutants of this species.

THE ANTIBIOTIC

(1) Preparation of Antibiotic W847 Complex

*Micromonospora sp. W847*, by controlled fermentation techniques as described hereafter, produces a complex mixture of antibiotic substances hereinafter referred to as the Antibiotic W847 Complex. This antibiotic complex may also be referred to as Antibiotic W847 or *megalomicin;* the names are synonymous and may be used interchangeably.

In order to prepare a suitable inoculum for subsequent fermentation, *Micromonospora sp. W847* is grown under submerged aerobic conditions with continual agitation at temperatures ranging from about 22° to about 37° C. for a period of from about 2 to about 4 days. Generally, a temperature of 35° C. over a 3 day period is found most satisfactory. The medium normally used in this first germination stage is aqueous and contains quantities of carbon and nitrogen sources assimilable by the organisms. The alkalinity of the media desirably is adjusted to about pH 7.5 before autoclaving by the addition of base such as sodium hydroxide.

Exemplary of media employed in the germination stage, are the following: Medium 1: Bacto-Beef Extract (Difco), 3.0 gm; Bacto-Tryptone (Difco), 5.0 gm.; dextrose, 1.0 gm.; starch (potato), 24.0 gm.; Bacto-Yeast Extract (Difco), 5.0 gm.; CaCO$_3$, 2.0 gm.; tap water, 1000 ml.; Medium 2: Bacto-Yeast Extract (Difco), 5.0 gm. fish solubles, 1.0 gm.; corn steep liquor, 1.0 gm.; dextrose, 20.0 gm., CaCO$_3$, 1.0 gm.; tap water, 1000 ml.

Desirably, a second germination stage (e.g. inoculum stage) is employed prior to fermentation and harvesting of the antibiotic in order to enrich the inoculum. Employing media as described above, fresh medium is inoculated with the germinated culture previously prepared (5% w./v.) and incubated at about 22 to about 37° C. for about 2 to about 4 days. Usually, a temperature of 28° C. over a period of 3 days is found most satisfactory.

In order to produce the Antibiotic W847 Complex, a 5 percent (w./v.) inoculum taken from the inoculum stage is added to aqueous fermentation medium which, prior to autoclaving, has been adjusted to about pH 7.1 to 7.8. Air, usually about 3 to about 6 liters per minute, is introduced into the fermentation which, generally, is conducted at a temperature between about 22 to about 37° C. over a period of about 2 to about 6 days with continuous agitation. Particularly with reference to Medium 3, described below, it has been found that maximum yields of Antibiotic W847 Complex are obtained following fermentation for 66 hours at 31° C. with introduction of air at a rate of 4.5 liters per minute and with impeller agitation at 250 r.p.m. Using 14 liter fermenters containing 10 liters of medium, yields ranging from 300 to 800 mcg./ml. have been obtained under these conditions.

Media useful in the fermentation stage include, for example, the following: Medium 3: sucrose, 30.0 gm.; dextrose, 2.5 gm.; trypticase, 17.0 gm.; NaNO$_3$, 3.0 gm.; K$_2$HPO$_4$, 3.5 gm.; MgSO$_4$.7H$_2$O, 0.5 gm.; KCl, 0.5 gm.; FeSO$_4$, 0.01 gm.; NaCl, 5.0 gm.; tap water, 1000 ml.; Medium 4: Bacto-Yeast Extract (Difco), 5.0 gm.; dextrose, 10.0 gm.; starch, 20.0 gm.; casein hydrolysate, 5.0 gm.; CaCO$_3$, 4.0 gm.; tap water, 1000 ml.; Medium 5: sucrose, 20.0 gm.; peptone, 5.0 gm.; cotton seed protein hydrolysate, 5.0 gm.; CaCO$_3$, 4.0 gm.; tap water, 1000 ml.; Medium 6: sucrose, 30.0 gm.; peptone, 8.0 gm.; NaNO$_3$, 3.0 gm.; K$_2$HPO$_4$, 1.0 gm.; MgSO$_4$.7H$_2$O, 0.5 gm.; FeSO$_4$, 0.01 gm.; tap water, 1000 ml. Medium 7: trypticase, 17 gm.; NaCl, 5.0 gm.; K$_2$HPO$_4$, 2.5 gm.; dextrose, 2.5 gm.; Czapek-Dox broth, 35.0 gm.; tap water, q.s. 1000 ml.

For recovery of Antibiotic W847 Complex from the fermentation medium, the whole broth is adjusted to about pH 9.5 with base such as, for example, sodium hydroxide. The whole broth then is extracted with about 2 volumes for each volume of broth with a suitable immiscible organic solvent, such as, for example, ethyl acetate, methylene dichloride, butyl acetate, chloroform, butanol and the like. The solvent phase is next concentrated under vacuum to a small volume, approximately 100 fold concentration, and is purified by column chromatography employing, for example, LH 20 Sephadex, an alkylated cross-linked dextran (Pharmacia Fine Chemicals, Inc., Uppsala, Sweden), suspended in about 95 percent aqueous ethanol. The column is eluted with the aqueous ethanol. Column fractions are combined according to their antibacterial activities by agar disc testing against *Staphylococcus aureus* (ATCC 6538P), concentrated to dryness, dissolved in a small amount of ethyl ether or acetone and added to an excess volume of petroleum ether (b.p. about 30 to about 60° C.). The mixture is then transferred to a Dry Ice-acetone bath (approximately —50° C.) and allowed to stand for about 20 minutes after which it is allowed to return to room temperature. The mother liquor is separated from any oily residue by decanting and is concentrated to dryness. Material produced in this manner is usually found to have potency of about 232 mcg./mg. according to the bio-assay procedure described below.

The assay is a cylinder cup assay using *Sarcina lutea* (ATCC 9341) as the test organism. The conditions of the assay are similar to the cylinder plate assay described for erythromycin (Grove and Randall, 1955, Med. Encyclopedia, Inc., N.Y.). A mcg. of Antibiotic W847 Complex activity is the amount of material which produces a zonal response of 20.8±0.5 mm. under the conditions of this assay.

Alternatively, Antibiotic W847 Complex may be prepared by utilizing the following fermentation and isolation techniques:

Employing Medium 1 for the preparation of an inoculum, fermentation flasks containing this medium are inoculated with a culture (approximately 5% w./v.) of *Micromonospora sp. W847*. The flasks are placed on a rotary shaker running at about 280 strokes per minute and are incubated at 28° C. for 72 hours. At the end of this time, fermentors, each charged with fermentation medium (Medium 7 for example), adjusted to pH 7.15 to 7.25, are inoculated with approximately 5% (v./v.) of the 72 hour inoculum culture. The fermentation medium is agitated at a rate of about 500 r.p.m. at a temperature of 31° C. Air flow is induced through the medium at a rate of about 0.5 liters of air/liter of broth/minute. The agitation rate may be increased to 600 r.p.m. after 24 hours and to 700 r.p.m. after 48 hours. Fermentation is terminated at the end of about 69 hours. The broth from all fermentors is pooled for extraction and recovery of Antibiotic W847 Complex as described below.

utes. The agar plate is incubated at 37° C. overnight and the zones of inhibition evaluated.

Results of these experiments are shown in Table 4 below.

TABLE 4.—COMPARATIVE THIN LAYER CHROMATOGRAPHY OF ANTIBIOTIC W847 COMPLEX

| System | Antibiotic | $R_f$ and color by $H_2SO_4$ spray | $R_f$ of inhibition zone |
|---|---|---|---|
| Chloroform:methanol:17% ammonia 2:1:1 (v./v.). | Antibiotic W847 complex | Blue black, 0.98 | 0.98 |
|  | Oleandomycin | Green, 0.98 | 0.98 |
|  | Erythromycin | Yellow tan, 0.98 | 0.98 |
|  | Magnamycin | Blue purple, 0.98 | 0.98 |
| Butanol:acetic acid:water 3:1:1 (v./v.). | Antibiotic W847 complex | Red purple, 0.13 | 0.13 |
|  | Erythromycin | Green brown, 0.26 | 0.26 |
|  | Spiramycin | Purple, gray, 0.06, 0.30 | 0.06 |
|  | Oleandomycin | Green, 0.19 | 0.19 |
|  | Magnamycin | Purple, red purple, 0.40, 0.47 | 0.40 |

The pooled fermentation broth is adjusted to about pH 9.25 with aqueous sodium hydroxide (50%) and is extracted with about 2 volumes of ethyl acetate and the extracts are concentrated to about one to two percent of the original volume. The ethyl acetate concentrate is then extracted at least twice with half volumes of hydrochloric acid (about 0.14 N). Alternatively, the acid extraction can be carried out with other mineral acids at about the same normality. The combined acid extracts are made slightly alkaline with 5% aqueous sodium hydroxide (to about pH 8.5 to 9.0) and are extracted at least twice with about equal volumes of ethyl acetate. The combined ethyl acetate extracts are concentrated to dryness under reduced pressure to obtain the Antibiotic W847 Complex. The complex at this stage will show a potency of 450 to 550 mcg./mg. in the assay described above.

(2) Chemical Characterization of Antibiotic W847 Complex

Antibiotic W847 Complex was compared by paper chromatography with a variety of antibiotics, including several macrolides. In a series of solvent systems, as shown in Table 3 below, Antibiotic W847 Complex moves as a single spot and is differentiated from all other antibiotics except the macrolides which were tested (i.e. magnamycin, oleandomycin, spiramycin and erythromycin).

Further, by comparison of the physical, chemical and biological properties of Antibiotic W847 Complex, and of its separated fractions, as hereinafter described with properties of known macrolides as reported in the literature, Antiobotic W847 Complex and its components are distinguishable from all known macrolide antibiotics.

Antibiotic W847 Complex gives a positive color reaction in the Ninhydrin, Starch-KI and Biuret tests and a negative color reaction in the Stannous Chloride, Molisch and Sagaguchi tests. The complex is essentially transparent in the ultraviolet region. The activity of Antibiotic W847 Complex is not significantly altered when a solution thereof is subjected to a temperature of 100° C. for 30 minutes throughout the pH range of 2 to 10 (stability is tested by dissolving the antibiotic in ethanol, diluting with buffer, and disc testing against *S. aureus* and *Escherichia coli*). The complex shows no loss in activity after treatment with trypsin, chymotrypsin, pepsin, α-amylase or penicillinase in buffered solution (optimal pH for each enzyme) at 37° C. for up to 24 hours exposure. Antibiotic W847 Complex is soluble in most polar organic solvents such as, for example, ethyl acetate, methanol and acetone.

(3) Separation of Antibiotic W847 Components

Bioautography of thin layer silica gel plates on agar seeded with *Sarcina lutea* following chromatography in a TABLE 3.—COMPARATIVE $R_f$ VALUES OF ANTIBIOTIC W847 COMPLEX

| Paper chromatographic systems | $R_f$'s of antibiotics ||||||||||||
|---|---|---|---|---|---|---|---|---|---|---|---|---|
|  | Antibiotic W847 Complex | Magnamycin | Oleandomycin | Erythromycin | Spiramycin | Penicillin | Kanamycin | Chloramphenicol | Chlortetracycline | Gentamicin | Streptomycin | Tetracycline |
| 80% methanol plus 3% sodium chloride (w./v.) 1:1 descending* | 0.90 | 0.90 | 0.90 | 0.90 | 0.90 | 0.63 | 0.30 | 0.84 | 0.74 | 0.59 | 0.57 | 0.72 |
| Propanol:pyridine:acetic acid:water (6:4:1:3) ascending (v./v.) | 0.93 | 0.93 | 0.93 | 0.93 | 0.93 | 0.91 | 0.18 | 0.91 | 0.75 | 0.26 | 0.40 | 0.70 |
| Butanol:acetic acid:water (4:1:5) ascending (v./v.) | 0.78 | 0.78 | 0.78 | 0.78 | 0.78 | 0.85 | 0.00 | 0.92 | 0.46 | 0.00 | 0.00 | 0.38 |
| 80% phenol ascending (v./v.) | 0.86 | 0.86 | 0.86 | 0.86 | 0.86 | 0.81 | 0.17 | 0.93 | 0.87 | 0.50 | 0.06 | 0.83 |

*Paper buffered with 0.95 molar $Na_2SO_4$ + 0.05 molar $NaHSO_4$.

Differentiation of Antibiotic W847 Complex from these important macrolide antibiotics was made by thin layer chromatograph on silica gel GF plates (Analtech Inc., Wilmington, Del.). Zones were detected by the following two methods:

1. Plates are sprayed with a mixture of concentrated sulfuric acid-methanol (1:1 v./v.) and developed by heating at 105° C. for several minutes. The zones of organic material appear as colored areas against a white background.

2. Plates are allowed to remain in contact with an agar layer seeded with *S. aureus*. A sheet of Whatman No. 1 paper is placed between the seeded agar layer and the plate to insure that the silica gel does not adhere to the agar. The paper and silica gel are removed after 15 minsolvent system consisting of chloroform:methanol (60:40 v./v.) indicates that Antibiotic W847 Complex consists of at least four antibiotic components which will be identified hereinafter as Antibiotic W847 Fractions A, B, $C_1$ and $C_2$ (or as Antibiotic W847-A, Antibiotic W847-B, Antibiotic W847-$C_1$ and Antibiotic W847-$C_2$). These fractions may also be referred to as megalomicin-A, megalomicin-B, magalomicin-$C_1$ and megalomicin-$C_2$, respectively. These fractions, in the solvent system described above, show $R_f$ values of 0.19 (Fraction A), 0.38 (Fraction B), 0.52 (Fraction $C_1$) and 0.65 (Fraction $C_2$) respectively.

Separation of the fractions is achieved by dissolving Antibiotic W847 Complex in acetone mixed with silicic acid, evaporating the acetone and adding the dry mixture to the top of a silicic acid column. The column is eluted with chloroform:methanol (60:40 v./v.) and fractions are collected. The column is monitored by disc testing each fraction against *S. aureus* and *E. coli*. The active fractions are chromatographed on silica gel thin layer plates run for about 1.5 hours in the same solvent system used for the column. The pattern of the antibiotic fractions are detected by the two methods previously described. Fractions are combined according to their chromatographic patterns and are concentrated.

By this method, Fraction $C_2$ as a hydrochloride salt is separated and isolated as a white powder by dissolving the pooled active fractions in methanol and precipitating with about 10 volumes of ethyl ether. Fractions $C_2$ hydrochloride at this stage exhibits a potency of about 1100 mcg./mg.

During chromatography W847–$C_2$ base is converted to a hydrochloride salt by reaction with small quantities of hydrogen chloride present in the solvent. The hydrochloride, as would be expected, does not exhibit appreciable solubility in ethyl ether and is, therefore, precipitated by the addition thereof.

The free base form of W847–$C_2$ may be obtained by adding dilute alkali such as .1 N NaOH to an aqueous solution of the hydrochloride to about pH 8.5–9.5 and separating the free base by filtration from the aqueous suspension.

Later fractions collected from the solumn described above when pooled and concentrated to dryness yield a white powder Antibiotic W847–$C_1$ fraction. At this stage, the Antibiotic W847–$C_1$ powder obtained displays a potency of about 880 mcg./mg. in the previously described cylinder cup assay.

Using the bioautograph techniques previously described (see Chemical Characterization of Antibiotic W847 Complex) and chloroform:methanol (60:40 v./v.) as the solvent system, the Antibiotic W847–$C_1$ isolate has broad spectrum antibacterial activity in vitro against the following gram-positive and gram-negative organisms: percent

*Bacillus subtilis* ATCC 6633
*Sarcina lutea* ATCC 9341
*Staphylococcus aureus* ATCC 6538P
*Pseudomonas aeruginosa* ATCC 8689

The remaining active fractions from the silicic acid column are combined and further resolution is achieved by Florisil (magnesium silicate) column chromatography.

Employing this technique, separation of Fraction A and Fraction B is accomplished. Both are isolated as off-white powders by concentration of the pooled chromatographic fractions to dryness. Fractions A and B assayed at 145 mcg./mg. and 71 mcg./mg. respectively, in the *S. lutea* assay.

Alternatively, a mixture of Antibiotic W847–C fractions may be isolated from the ethyl acetate concentrate prepared as described hereinabove. The residue is dissolved in acetone and poured into cold water with vigorous stirring. The suspension is permitted to warm to room temperature and filtered. The precipitate comprises a mixture of Antibiotic W847–$C_1$ and Antibiotic W847–$C_2$ said mixture sometimes referred to as Antibiotic W847–C Complex (or Antibiotic W847–C or *megalomicin-C*). As precipitated, *megalomicin-C* is in the form of the free base. An acid addition salt of the complex may conveniently be prepared by the titration of a methanol solution of the base with the appropriate acid and by precipitating the salt by the addition of ethyl ether. When the foregoing procedure is utilized to obtain the Antibiotic W847–C Complex, Antibiotics W847–A and W847–B may be extracted from the aqueous filtrate and the extract subsequently concentrated to a residue and chromatographed on magnesium silicate as described above.

(4) Chemical Characterization of Antibiotic W847 Fractions A, B, $C_1$ and $C_2$ The antibiotics of this invention are nitrogen bases; consequently, each fraction is capable of forming acid addition salts in a manner similar to that described for the Antibiotic W847–C Complex. Typical of such salts are those formed with such acids as hydrochloric, sulfuric, phosphoric, stearic, propionic, tartaric, maleic and the like. These salts display antibiotic activity similar to that of the antibiotic free base but may differ somewhat in potency and solubility characteristics.

The antibiotics of this invention are also hydroxlyated compounds; consequently, they are capable of being esterified, preferably with a hydrocarbon carboxylic acid. Exemplary of such esters are acetates, propionates, cyclopropyl carboxylates, succinates, benzoates and the like. Such esters generally exhibit antibiotic activity similar to that of the free antibiotic usually differing in potency and solubility characteristics.

In Table 5 below is set forth the chemical and physical properties of Antibiotic W847 Fractions A, B, $C_1$ and $C_2$.

TABLE 5.—CHEMICAL AND PHYSICAL PROPERTIES OF ANTIBIOTIC W847 FRACTIONS

| | Fraction A | | Fraction B | | Fraction $C_1$ | | Fraction $C_2$ | |
|---|---|---|---|---|---|---|---|---|
| Optical rotation $[\alpha]_D^{25}$ 1% in ethanol | −90° | | −92° [1] | | −104° | | −102° | |
| Melting point | 255°–259° dec. | | 125°–135°C. dec. | | 243–246° C. dec. | | 146–150° C. dec. | |
| PKa | 9.1 | | 8.8 | | 8.8 | | 8.6 | |
| Neutralization eq | 442 | | 490 | | 488 | | 492 | |
| | Found | Calculated | Found | Calculated | Found | Calculated | Found | Calculated |
| Elemental analysis: | | | | | | | | |
| Carbon | 60.23 | 60.25 | 58.90 | 60.11 | 60.23 | 59.98 | 58.93 | 60.35 |
| Hydrogen | 9.28 | 9.19 | 8.94 | 8.99 | 8.93 | 8.81 | 8.73 | 8.89 |
| Nitrogen | 3.30 | 3.19 | 2.88 | 3.05 | 2.94 | 2.92 | 2.88 | 2.87 |
| Oxygen (by difference) | 27.19 | 27.36 | 29.18 | 27.85 | 27.90 | 28.30 | 29.46 | 27.89 |
| Empirical formula | $C_{44}H_{80}N_2O_{15}$ | | $C_{46}H_{82}N_2O_{16}$ | | $C_{48}H_{84}N_2O_{17}$ | | $C_{48}H_{86}N_2O_{17}$ | |
| Molecular weight | 877.10 | | 919.14 | | 961.17 | | 975.20 | |

[1] Monohydrate.

The column is prepared by activating the Florisil at 100° C. for 16 hours; fixing in hexane and pouring the resulting slurry into a glass column. The column is charged with residual Antibiotic W847 Complex (after removal of Fractions $C_1$ and $C_2$) dissolved in methylene chloride and is developed progressively with one holdup volume (i.e. that volume of solvent which is held by the absorbent) of hexane, one hold-up volume of ethyl ether, one hold-up volume of ethyl acetate and then with increasing amounts of acetone in ethyl acetate. Separation is monitored by disc testing the fractions against *S. aureus* and *E. coli* followed by thin layer chromatography as previously described.

The infrared spectra of Antibiotic W847 Fractions A, B, $C_1$ and $C_2$ are shown in the drawings as FIGS. 1, 2, 3 and 4 respectively. The spectra of the respective Antibiotic fractions were run in mineral oil (Nujol) and the more significant absorption peaks are set forth in Table 6 with the following designations: S=strong, M=moderate, W=weak, VS=very strong, M—S=moderate to strong, brd.=broad, shp.=sharp, shd.=shoulder and s.b.=side band.

The Antibiotic W847 Fractions A, B, $C_1$ and $C_2$ have characteristic nuclear magnetic resonance spectra which as shown in the drawings as FIGS. 5, 6, 7 and 8 respectively. The NMR spectra were observed on a Varian A–60–A spectrometer on a solution (ca. 0.4 ml., ca. 20 mg./ml.) of the sample of each fraction in deuterated chloroform. The spectra are recorded in parts per million (p.p.m.) from tetramethylsilane, the internal standard.

TABLE 6.—INFRARED SPECTRA OF ANTIBIOTIC W847 FRACTIONS

| Fraction A | | Fraction B | | Fraction C$_1$ | | Fraction C$_2$ | |
|---|---|---|---|---|---|---|---|
| Wave length ($\mu$) | Peak strength | Wave-length | Peak strength | Wave-length | Peak strength | Wave-length | Peak strength |
| 2.82–2.90 | M-S, brd | 2.87 | N | 2.82 | S,b | 2.83 | W-M. |
| 3.35–3.50 | Nujol | 2.97 | Shd | 2.87 | W | 3.33–3.48 | Nujol. |
| 5.77 | S | 3.35–3.50 | Nujol | 3.35–3.50 | Nujol | 5.70 | S. |
| 5.82 | (¹) | 5.72 | S | 5.72 | S | 5.80 | (¹). |
| 5.88 | M-S | 5.83 | S | 5.87 | W-M | 5.88 | Shd. |
| 6.82 | Nujol | 6.82 | Nujol | 6.82 | Nujol | 6.80 | Nujol. |
| 7.24 | ...do | 7.25 | ...do | 7.25 | ...do | 7.23 | Do. |
| 7.36 | S,b | 8.05 | S | 7.45 | M | 8.00 | S. |
| 7.82 | M-S, shp | 8.45 | S, brd | 7.57 | M | 8.53 | S, brd. |
| 8.45 | VS, brd | 8.59 | S | 7.82 | M | 8.93 | S. |
| 8.92 | VS | 8.94 | S | 8.03 | S | 9.08 | Shd. |
| 9.02 | VS | 9.50 | S | 8.13 | VS | 9.27 | M-S. |
| 9.12 | VS | 9.62 | S | 8.60 | S | 9.65 | S. |
| 9.32 | M-S | 9.91 | M-S | 8.94 | M-S | 10.00 | M-S, brd. |
| 9.53 | VS | 10.02 | M-S | 9.05 | S | 10.38 | M. |
| 9.63 | VS | 10.29 | M | 9.56 | S | 10.97 | M. |
| 9.98 | VS | 10.84 | W-M | 9.70 | S | 11.15 | M. |
| 10.27 | S | 11.08 | W-M | 10.13 | M-S | 11.52 | W. |
| 11.02 | M-S | 11.20 | W-M | 10.48 | M | 11.92 | W-M. |
| 11.17 | M-S | | | 11.02 | W-M | | |
| | | | | 11.18 | W-M | | |

¹ Instrument artifact.

On the basis of the foregoing chemical and physical properties, Antibiotic W847 (megalomicin) is believed to have a gross molecular strutcture as follows:

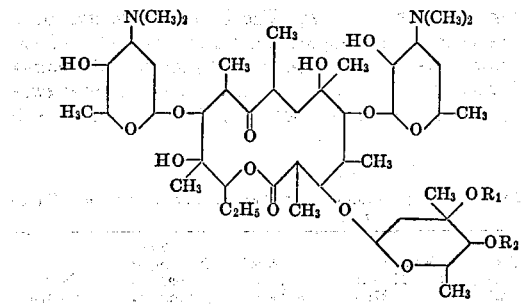

wherein R$_1$ is a member selected from the group consisting of hydrogen and acetyl; and R$_2$ is a member selected from the group consisting of hydrogen, acetyl and propionyl.
Antibiotic W847–A (megalomicin-A) R$_1$=R$_2$=hydrogen
Antibiotic W847–B (megalomicin-B) R$_1$=hydrogen, R$_2$=acetyl
Antibiotic W847–C$_1$ (megalomicin-C$_1$) R$_1$=R$_2$=acetyl
Antibiotic W847–C$_2$ (megalomicin-C$_2$) R$_1$=acetyl, R$_2$=propionyl (5) Biological Properties of Antibiotic W847 Complex, Fractions A, B, C$_1$, C$_2$ and Antibiotic W847–C Complex (A) In Vitro Tests.—Antibiotic W847 Complex, Fractions A, B, C$_1$ and C$_2$ and Antibiotic W847–C Complex all possess a broad spectrum antibacterial activity in vitro against a variety of gram-positive and gram-negative organisms. Either as a complex or as individual fractions, therefore, they may be used to clean and sterilize laboratory glassware, to clean and sterilize surgical instruments and the like. Also, these antibiotics may be used in combination with soaps and detergents to clean and sanitize areas used for food preparation such as kitchens, dining halls and the like.

The in vitro antibacterial spectrum of Antibiotic W847 Complex, Fractions A, B, C$_1$ and C$_2$ and Antibiotic W847–C Complex against typical gram-positive and gram-negative organisms is shown in Table 7 below. The susceptibility of the test organisms to the antibiotics was determined by a tube dilution assay in yeast beef broth adjusted to pH 8.0 with sodium hydroxide.

TABLE 7.—ANTIBACTERIAL SPECTRUM OF ANTIBIOTIC W847 COMPLEX AND FRACTIONS A, B, C$_1$, C$_2$ AND C-COMPLEX

| | Minimal inhibitory concentration (mcg./ml.) antibiotic W847 | | | | | | |
|---|---|---|---|---|---|---|---|
| Microorganism | Complex base | Complex HCl | Fraction A | Fraction B | Fraction C$_1$ | Fraction C$_2$ | C-complex |
| Bacillus megatherium DA 7064 | 0.3 | 0.3 | 0.6 | 1.2 | 0.3 | 0.6 | 0.3 |
| Bacillus subtilis ATCC 6633 | 0.03 | 0.3 | 0.005 | 0.05 | 0.03 | 0.005 | 0.005 |
| Diplococcus pneumoniae DA 700 | | | 1.2 | 1.2 | | 0.6 | |
| Diplococcus pneumoniae ATCC 10015 | | | 0.5 | 9.5 | | 0.05 | |
| Diplococcus pneumoniae DA 150 | 6.0 | 6.0 | >2.7 | >2.7 | 12.0 | >2.7 | >2.7 |
| Enterococcus sp DA 800 | 0.3 | 0.75 | 0.6 | 0.6 | 0.3 | 0.08 | 0.3 |
| Enterococcus sp DA 801 | 0.3 | 0.75 | 0.6 | 0.6 | 0.3 | 0.6 | 0.3 |
| Enterococcus sp DA 802 | 0.3 | >1.0 | 0.2 | 0.2 | 0.3 | 0.03 | 0.3 |
| Sarcina lutea ATCC 9341 | 0.0075 | .0075 | 0.005 | 0.05 | 0.0075 | 0.0005 | 0.'0075 |
| Staphylococcus aureus ATCC 12715 | 0.3 | 0.75 | 0.08 | 0.2 | 0.3 | 0.005 | 0.03 |
| Staphylococcus aureus ATCC 6538P | 0.3 | 0.03 | 0.6 | 0.2 | 0.03 | 0.005 | 0.03 |
| Staphylococcus aureus ATCC 11631 [1] | 0.3 | 0.075 | 0.6 | 0.6 | 0.3 | 0.6 | 0.3 |
| Staphylococcus aureus (Gray) | 0.3 | 0.3 | 0.6 | 0.6 | 0.3 | 0.6 | 0.55 |
| Staphylococcus aureus DA 2001 | 0.03 | 0.3 | 0.6 | 0.2 | 0.03 | 0.03 | 0.03 |
| Staphylococcus aureus DA 2003 | 0.03 | 0.03 | 0.6 | 0.6 | 0.075 | 0.6 | 0.3 |
| Staphylococcus aureus DA 2010 | 0.3 | 0.3 | 0.6 | 0.6 | 0.3 | 0.2 | 0.25 |
| Staphylococcus aureus DA 2014 | 0.3 | 0.3 | 0.6 | 0.6 | 0.03 | 0.6 | 0.03 |
| Staphylococcus aureus DA 2018 | 0.3 | 0.3 | 0.6 | 0.6 | 0.075 | 0.1 | 0.03 |
| Staphylococcus aureus DA 2032 | 0.075 | 0.3 | 0.6 | 0.6 | 0.075 | 0.08 | 0.08 |
| Staphylococcus aureus DA 2033 [2] | >16 | >16 | >2.7 | >2.7 | >32.0 | >2.7 | >2.7 |
| Streptococcus faecalis DA 20 | 0.3 | 0.3 | 0.03 | 0.1 | 0.3 | 0.005 | 0.075 |
| Streptococcus pyogenes DA 21 | 0.75 | >1.0 | 5.0 | 5.0 | 0.3 | 0.6 | 0.3 |
| Streptococcus pyogenes DA 11 | 0.3 | | 0.6 | 0.2 | 0.3 | 0.03 | 0.3 |
| Streptococcus pyogenes DA 12 | | | 0.2 | 0.2 | | 0.03 | |
| Mycobacterium smegmatis ATCC 10143 | 0.75 | 0.3 | 5.0 | 5.0 | 0.3 | 0.05 | 0.3 |
| Escherichia coli ATCC 10536 | 6.0 | >16 | 6.0 | 12.0 | 12.0 | 12.0 | 12.0 |
| Klebsiella pneumoniae ATCC 10031 | 12.0 | >16 | 6.0 | 24.0 | 12.0 | 24.0 | 12.0 |
| Proteus vulgaris DA 121 | 6.0 | >16 | 12.0 | 24.0 | 24.0 | 24.0 | 24.0 |
| Pseudomonas aeruginosa ATCC 8689 | 6.0 | 12.0 | 6.0 | 12.0 | 6.0 | 6.0 | 6.0 |
| Salmonella schottmuelleri DA 10 | 6.0 | 12.0 | 6.0 | 12.0 | 12.0 | 12.0 | 12.0 |

[1] Penicillin resistant strain.
[2] Erythromycin resistant strain.

NOTE.—Medium=yeast beef broth (pH 8.0); Complex=mixture of components A, B, C$_1$ and C$_2$.

The antibacterial activity of Antibiotic W847 Complex is compared with that of orythromysin, penicillin G. and methicillin in Table 8 below (susceptibility being determined by the tube dilution assay technique described above). The results show that Antibiotic W847 Complex compares favorably in activity to the other antibiotics tested against gram-positive bacteria. In addition, Antibiotic W847 Complex is active against Mycobacterium smegmatis at a lower concentration than erythromycin, while penicillin G and methicillin are inactive up to 10 mcg./ml.

TABLE 8.—COMPARISON OF THE ANTIBACTERIAL SPECTRUM OF ANTIBIOTIC W847 COMPLEX WITH ERYTHROMYCIN, PENCILLIN G AND METHICILLIN

|  | Complex | Erythromycin | Penicillin G | Methicillin |
|---|---|---|---|---|
| Bacillus cereus | 0.2 | 0.05 | 0.12 | 4.8 |
| Bacillus subtilus | 0.005 | 0.005 | 0.01 | 0.03 |
| Diplococcus pneumoniae | 0.2 | 0.05 | 0.12 | 1.8 |
| Sarcina lutea | .0005 | 0.005 | 0.06 | 0.3 |
| Staphylococcus aureus (3) | 0.005-0.2 | 0.005-0.05 | 0.003-0.06 | 0.12-0.6 |
| Staphylococcus aureus (7)[1] | 0.03-0.6 | 0.005-0.5 | 1.2-9.4 | 1.2-7.5 |
| Staphylococcus aureus (1)[2] | 2.7 | 50.0 | | |
| Streptococcus feacalis | 0.005 | 0.0005 | 0.75 | 25.0 |
| Streptococcus pyogenes (4) | 0.03-022 | 0.05 | 0.01-0.02 | 0.6 |
| Mycobacterium amegmatis | 0.5 | 5.0 | 10 | 10 |

[1] Clinical isolates including penicillin resistant organisms.
[2] Clinical isolates resistant to erythromycin.
( ) = Number of strains.

NOTE.—Medium = Antibiotic W847 complex and erythromycin in yeast beef broth at pH 8.0. Penicillin G and methicillin in Yeast beef broth at pH 6.8.

(B) In Vivo Tests.—As was noted above, Antibiotic W847 Complex, Antibiotic W847-C Complex, Fractions A, B, $C_1$ and $C_2$ exhibit a broad range of anti-microbial activity against gram-positive and gram-negative microorganisms. Included in the gram positive group are pathogenic microorganisms including species of the genus Streptococcus, Staphylococcus and Diplococcus which are known to cause many disease manifestations. Various species of Staphylococcus and Streptococcus are the organisms responsible for causing bovine mastitis. These species are readily controlled and treated by means of the antibiotics disclosed herein after a relatively brief regimen of administration.

Antibiotic W847 Complex, Fractions A, B, $C_1$, $C_2$ and W847-C Complex are also active against gram-negative organisms including species of the genus Escherichia, Salmonella, Proteus and Pseudomonas. These organisms are responsible for many serious disease syndromes including urinary tract infections and diarrheas. Such syndromes are quite common in domestic animals such as cattle, horses, sheep, swine, dogs and cats and may be effectively controlled and treated by means of the antibiotics described herein.

Antibiotic W847 Complex suspended in peanut oil gives an $LD_{50}$ (lethal dose for 50 percent of the population tested) of 270 mg./kg. in mice by the intraperitoneal route. On subcutaneous and oral administration, the $LD_{50}$ is greater than 5000 mg./kg. The $PD_{50}$ (protective dose for 50 percent of the population tested) is 150 mg./kg. by the subcutaneous route (peanut oil suspension) against a lethal infection of S. aureus in mice. Against Streptococcus pyogenes by the same route, the $PD_{50}$ in mice is 100 mg./kg.

TABLE 10

Toxicity of antibiotic W847 fractions and complexes and of erythromycin in mice ($LD_{50}$ in mg./kg.)

| Route | W847 complex base in peanut oil | W847 complex HCl in $H_2O$ | W847 fraction A base [1] | W847 fraction B base in peanut oil | W847-C complex |
|---|---|---|---|---|---|
| Oral | >1,160 | >2,500 | 7,500 | | >500 |
| Subcutaneous | >1,160 | 2,500 | 7,000 | >500 | >500 |
| Intraperitoneal | 75 | 300 | 350 | | 400 |

| | W847-$C_1$ base [1] | W847-$C_2$ HCl in $H_2O$ | Erythromycin base in peanut oil | Erythromycin HCl in $H_2O$ | |
|---|---|---|---|---|---|
| Oral | >1,000 | >500 | [3] >3,000 | [2] 2,927 | |
| Subcutaneous | >1,000 | >500 | >2,500 | [2] 1,849 | |
| Intraperitoneal | 500 | >500 | 590 | [2] 490 | |

[1] In 0.5% aqueous carboxymethyl-cellulose.
[2] Values reported by Grundy (1966) Experimental Chemotherapy, volume III.

TABLE 11

Activity of antibiotic W847 complex and erythromycin against lethal intraperitoneal infections in mice ($PD_{50}$ in mg./kg.)

[Figures are $PD_{50}$'s in mg./kg.]

| | Subcutaneous treatment | | | |
|---|---|---|---|---|
| | Antibiotic W847 complex in peanut oil | Antibiotic W847 complex HCl in $H_2O$ | Antibiotic W847 fraction $C_1$ HCl in $H_2O$ | Erythromycin base in— |
| | | | | Peanut oil | HCl |
| Staphylococcus aureus Gray | 35 | 4.3 | 5 | 15 | <6.3 |
| Staphylococcus aureus DA 2030 | | 4.3 | | | |
| Staphylococcus aureus DA 2000 | | 3.5 | | | |
| Staphylococcus aureus Smith | | 2.3 | | | |
| Streptococcus pyogenes C DA 21 | 23 | 4.6 | 45 | <12.5 | 10 |
| Streptococcus pyogenes DA 32 | | [1] 1.5 | | | |
| Streptococcus pyogenes DA 31 | | [1] 1.5 | | | |
| Streptococcus pyogenes DA 12 | | [1] 1.5 | | | |
| Streptococcus pyogenes DA 9 | | 1.5 | | | |
| Diplococcus pneumoniae DA 150 | 35 | 23.2 | 150 | 75 | |
| Diplococcus pneumoniae DA 150 (2 day treatment)/day | 23 | 11.6 | 30 | | |
| Diplococcus pneumoniae DA 151 | | 11.6 | | | |
| Diplococcus pneumoniae ATCC 10015 | | [1] 1.5 | | | |
| | Oral treatment | | | | |
| Staphyloccus aureus Gray | >116 | >116 | 50 | 150 | |
| Streptococcus pyogenes DA 21 | | >116 | | 37 | |
| Diplococcus pneumoniae DA 150 | | 116 | | 300 | |

[1] $PD_{100}$.

In addition to the foregoing, Antibiotic W847 Complex administered at 17.5 mg./kg. to dogs is detectable in the blood serum for 7 days. This is surprising in view of the fact that when a comparable dose of erythromycin is given it does not persist throughout a 24 hour interval.

Acute toxicity data for Antibiotic W847 fractions and complexes are compared with erythromycin in Table 10.

Tables 11, 12 and 13 are set forth to illustrate the animal protection exhibited by the antibiotics of the instant invention.

Antibiotic W847 Fraction $C_1$ suspended in 0.5% aqueous carboxymethyl cellulose and dispersed by ultrasonication is active in mice against S. aureus. When administered subcutaneously against S. aureus Gray is has a $PD_{50}$ of 62 mg./kg. By the same route it has a $PD_{50}$ of 180 mg./kg. against S. pyogenes C. The antibiotic is somewhat less active orally having a $PD_{50}$ against S. aureus Gray and S. pyogenes C of greater than 250 mg./kg. The $LD_{50}$ in mice by the subcutaneous route is greater than 1000 mg./kg. Antibiotic W847-$C_1$ exhibits anti-malarial activity against Plasmodium berghei and when adminis-

TABLE 12

Activity of antibiotic W847 fractions and erythromycin against lethal intraperitoneal infections in mice ($PD_{50}$ mg./kg.)

|  | Treatment route | W847-A base [1] | W847-$C_1$ base [1] | Erythromycin base [1] |
|---|---|---|---|---|
| Streptococcus pyogenes C 203 | Oral | 300 | 207 | 147 |
| Do | S.C. | 220 | 118 | 134 |
| Streptococcus pyogenes C | Oral | 300 | 300 | 180 |
| Do | S.C. | 134 | 180 | 90 |
| Streptococcus pyogenes No. 22 | Oral | 180 | >250 | 100 |
| Do | S.C. | 180 | 200 | 50 |
| Streptococcus pyogenes No. 9 | Oral | 250 | >250 | 120 |
| Do | S.C. | 167 | 250 | 140 |
| Staphylococcus aureus Smith | Oral | 250 | 180 | 167 |
| Do | S.C. | 75 | 117 | 40 |
| Staphylococcus aureus Gray | Oral | 300 | >250 | 106 |
| Do | S.C. | 20 | 62 | 30 |
| Staphylococcus aureus W | Oral | 117 | 150 | 53 |
| Do | S.C. | 20 | 25 | 20 |
| Staphylococcus aureus No. 41 | Oral | 150 | 170 | 757 |
| Do | S.C. | 20 | 25 | 20 |
| Diplococcus pneumoniae eye | Oral | 300 | 300 | 134 |
| Do | S.C. | 90 | 167 | 90 |
| Diplococcus pneumoniae No. 2 | Oral | 250 | 200 | 134 |
| Do | S.C. | 70 | 170 | 75 |
| Enterococcus No. 802 | Oral | 300 | >250 | 300 |
| Do | S.C. | 160 | 180 | 180 |
| Enterococcus No. 804 | Oral | 250 | 250 | 250 |
| Do | S.C. | 180 | 250 | 250 |
| Escherichia coli | Oral | 200 | 250 | >250 |
| Do | S.C. | 100 | 250 | 160 |
| Klebsiella pneumoniae | Oral | 250 | >250 | >250 |
| Do | S.C. | 150 | >250 | >250 |
| Pseudomonas aeruginosa | Oral | >250 | >250 | >250 |
| Do | S.C. | 161 | >250 | 130 |

[1] In 0.5% equeous carboxymethylcellulose.
NOTE.—S.C.=subcutaneous.

TABLE 13

Activity of antibiotic W847 fractions and combinations thereof against lethal intraperitoneal infections in mice ($PD_{50}$ in mg./kg.)

|  | W847-B base in peanut oil | W847-$C^1$ base [1] | W847-$C_2$ HCl in $H_2O$ | W847-C complex base [1] | W847-C complex HCl in $H_2O$ |
|---|---|---|---|---|---|
| Subcutaneous administration of antibiotics; organism: |  |  |  |  |  |
| Staphylococcus aureus Gray | 150 | 200 | 45 | 50 | 50 |
| Streptococcus pyogenes C | 150 | 150 | 10 | 50 | 50 |
| Staphylococcus aureus Smith |  |  |  | 86 |  |
| Streptococcus pyogenes No. 5 |  |  |  | 39 |  |
| Oral administration of antibiotics; organism: |  |  |  |  |  |
| Staphylococcus aureus Gray |  | >250 | 100 | 390 | >250 |
| Streptococcus pyogenes C |  | >250 | 100 | 310 | >250 |
| Staphylococcus aureus Smith |  |  |  | 310 |  |
| Streptococcus pyogenes No. 5 |  |  |  | 390 |  |

[1] Ultrasonicated suspension in aqueous 0.5% carboxymethyl cellulose.

Antibiotic W847 Fraction A suspended in 0.5% aqueous carboxymethylcellulose and dispersed by ultrasonication is active by subcutaneous administration in mice against S. aureus Gray with a $PD_{50}$ (protective dose for 50 percent of the poulation tested) of 20 mg./kg. and against P. aeruginosa with a $PD_{50}$ of 161 mg./kg. The $LD_{50}$ in mice by the subcutaneous route is 7000 mg./kg.

Antibiotic W847 Fraction B suspended in peanut oil is active by subcutaneous administration in mice against S. aureus with a $PD_{50}$ of 150 mg./kg. and against P. aeruginosa, 350 mg./kg. delays death by 24 hours. The $LD_{50}$ in mice by the subcutaneous route is greater than 500 mg./kg.

tered to rodents (100 mg./kg./day) 24 hours post-infection causes a significant suppression in the blood parasite count.

Antibiotic W847 Fraction $C_2$ as a suspension in aqueous carboxymethyl cellulose is active by subcutaneous administration. It is, however, more advantageously used as an aqueous solution of its hydrochloride salt and when administered subcutaneously to mice has a $PD_{50}$ of 45 mg./kg. against S. aureus Gray and a $PD_{50}$ of 10 mg./kg. against S. pyogenes C. By the oral route it has a $PD_{50}$ of 100 mg./kg. against both organisms. The $LD_{50}$ in mice by intraparitoneal administration is greater than 500 mg./kg.

PREPARATION OF PHYSICAL EMBODIMENTS

The following examples will more fully illustrate the preparation of the antibiotics described above and constitute the best mode contemplated by applicants for carrying out their invention.

(1) FERMENTATION OF THE MICROORGANISM

EXAMPLE 1

Shake Flask Fermentation (A) Germination Stage.—Add a 0.5 ml. lyophilized culture of *Micromonospora sp. W847* to a 300 ml. Erlenmeyer flask containing 100 ml. of the following medium which has been adjusted to pH 7.5 with dilute sodium hydroxide prior to sterilization:

|  | Gm. |
|---|---|
| Bacto-Beef Extract (Difco) | 3.0 |
| Bacto-Tryptose (Difco) | 5.0 |
| Dextrose | 1.0 |
| Starch (potato) | 24.0 |
| Bacto-Yeast Extract (Difco) | 5.0 |
| Calcium carbonate | 2.0 |
| Tap water, 1000.0 ml. | |

Incubate the flask and its contents for 3 days at 37° C. on a rotary shaker (280 r.p.m.; 2 inch stroke).

(B) Inoculum Stage.—Aseptically transfer a 25 ml. inoculum from the germination stage to a 2 liter Erlenmeyer flask containing 500 ml. of the sterile medium used above for germination. Incubate the flask and its contents for 3 days at 28° C. on a rotary shaker (280 r.p.m.; 2 inch stroke).

(C) Fermentation Stage.—Aseptically transfer 25 ml. aliquots from the inoculum stage to 2 liter Erlenmeyer flasks containing 500 ml. of the following sterile medium which has been adjusted to pH 7.8 with dilute aqueous sodium hydroxide prior to sterilization.

|  | Gm. |
|---|---|
| Sucrose | 30.0 |
| Sodium nitrate | 3.0 |
| Dipotassium phosphate | 1.0 |
| Magnesium sulfate | 0.5 |
| Ferrous sulfate | 0.01 |
| Peptone | 8.0 |
| Tap water, 1000.0 ml. | |

Incubate the flasks and their contents for 4 days at 28° C. on a rotary shaker (280 r.p.m.; 2 inch stroke). Pool the contents of the flasks and adjust an aliquot of the whole broth to pH 9.5 and extract with ethyl acetate (approximately 2 volumes per volume of broth). Separate the solvent phase and concentrate 100 fold under vacuum. Test the concentrate for activity by the agar disc diffusion technique using *S. aureus* (ATCC 6538P) as the test organism. The concentrate will give a zone of inhibition of approximately 20–35 mm.

EXAMPLE 2

Tank Fermentation (A) Germination Stage.—Carry out the germination stage and the inoculum stage in the manner described in Example 1.

(B) Fermentation Stage.—Aseptically transfer 500 ml. of inoculum to a 14 liter fermentor containing 10 liters of sterile medium as described in Example 1 to which has been added 6 ml. of anti-foam, Dow Corning B (Dow Corning Corporation, Midland, Mich.). Allow fermentation to proceed for 66 hours under the following conditions:

Temperature: 31° C.
Sterile air input: 4 liters/minute
Agitation: 250 r.p.m.
Anti-foam (Dow Corning B): Add as needed At the end of this period, the potency of the produced antibiotic reaches a peak which remains substantially constant. Throughout fermentation, the pH of the fermentation mixture remains substantially in the range of 7.2 to 8.2. The packed cell volume reaches a constant value of 3.5–4.5 ml. The activity of the produced antibiotic in the whole broth gives a zone diameter of 15–25 mm. when disc tested against *S. auerus* or *P. aeruginosa*.

EXAMPLE 3

Tank Fermentation

A) Preparation of Inoculum.—To four 2 liter flask each containing 500 ml. of sterile broth as described in Example 1A, add 0.5 ml. of a lyophilized culture of *Micromonospora sp.* (*W847*. Place the flasks on a rotary shaker running at 280 strokes per minute (2 inch stroke) and incubate at 28° C. for 72 hours.

(B) Fermentation Stage.—To each of four fermentors, add 10 liters of the following sterile production medium adjusted to pH 7.15 to 7.25 prior to sterilization:

|  | Gm. |
|---|---|
| Trypticase | 170.0 |
| Sodium Chloride | 50.0 |
| Dipotassium Phosphate | 25.0 |
| Dextrose | 25.0 |
| Czapek-Dox Broth | 350.0 |
| G.E.-60 Antifoam (General Electric Company, Schenectady, N.Y.). | |
| Tap water, q.s., 10.0 liters | |

Inoculate each fermentor with 500 ml. of the 72 hour seed culture prepared above. Bring the temperature of the ferentation medium to 31° C. and agitate at 500 r.p.m. while introducing air flow through the medium at the rate of 0.5 liters of air/liter of broth/minute. Increase the agitation rate to 600 r.p.m. after 24 hours and to 700 r.p.m. after 48 hours. Terminate the fermentation at the end of 69 hours. Pool the broths from the four fermentors for extraction (about 37 liters).

(2) EXTRACTION OF ANTIBIOTIC W847 COMPLEX

EXAMPLE 4

Extraction of Antibiotic W847 Complex from Laboratory Fermentation (Chromatographic Technique)

Adjust 60 liters of whole broth prepared according to the procedure described in Example 2 to pH 9.5 with dilute aqueous sodium hydroxide. Extract with 2 volumes of ethyl acetate for each volume of broth. Separate the solvent phase and concentrate under vacuum to obtain an oily residue (approximately 30.0 g.). The biological activity (1/20 dilution) of this oily residue will give a zone of inhibition diameter of about 20–30 mm. against *S. aureus* and about 15–25 mm. against *P. aeruginosa*. Purify the oily residue by column chromatography according to the following technique:

Prepare a column using 1000 g. of LH20 Sephadex (Pharmacia Fin Chemical, Inc.) suspended in 95 percent aqueous ethanol. Transfer the oily residue to the column and elute with 95 percent ethanol at a flow rate of 200 ml./hr. Collect 50 ml. fractions. Combine fractions according to their antibacterial activity (determined by agar disc testing against *S. aureus*. ATCC 6538P). Concentrate fractions having peak activity to dryness. Dissolve the solid residue in a small amount of acetone and pour into an excess volume of petroleum ether (B.P. 30–60° C.). Transfer the mixture to a Dry Ice-acetone bath (approximately −50° C.) and allow to stand 20 minutes. Allow the mixture to return to room temperature and separate the mother liquor from the oily residue by decanting. Concentrate the mother liquor to dryness to obtain purified Antibiotic W847 Complex.

Antibiotic W847 Complex so produced will have a potency of about 225 to 275 mcg./mg. when assayed according to the cylinder cup technique described above.

EXAMPLE 5

Extraction of Antibiotic W847 Complex From Tank Fermentation (Solvent Extraction Technique)

Adjust the pooled broth (about 37 liters) obtained as described in Example 3 to pH 9.5 with 50 percent aqueous sodium hydroxide. Extract with two volumes of ethyl acetate and evaporate the extract to a volume of 2,150 ml. Isolate the Antibiotic W847 Complex by one of the following techniques:

(A) Hydrochloric Acid Extraction.—Extract a 500 ml. aliquot of the ethyl acetate concentrate twice with 250 ml. portions of 0.5 percent (0.14 N) hydrochloric acid. Make the combined acid extracts slightly alkaline by the addition of 5 percent aqueous sodium hydroxide (about pH 8.5 to 9.0) and extract twice with 250 ml. portions of ethyl acetate. Combine the ethyl acetate extracts and concentrate under reduced pressure to dryness. The complex so produced will have a potency of about 525 mcg./mg. when assayed by the previously described cylinder cup technique (B) Sulfuric Acid Extraction.—Repeat the extraction described in Example 5A substituting 0.1 N sulfuric acid for the hydrochloric acid. The complex so produced will have a potency of about 550 mcg./mg. in the cylinder cup assay.

(3) RESOLUTION OF ANTIBIOTIC W847 COMPLEX

EXAMPLE 6

Isolation of Antibiotic W847 Fraction $C_2$

Prepare a column (105 cm. long, 7.6 cm. diameter) using 2000 g. of silicic acid (Analytical Reagent, Mallinckrodt) by packing small segments into a compact bed. Dissolve 13.0 g. of Antibiotic W847 Complex as prepared in Example 4 in acetone mixed with silicic acid and evaporate the acetone under vacuum. Add the dry mixture to the top of the column. Elute the column with a mixture of chloroform (60 parts by volume) and methanol (40 parts by volume) at a flow rate of 100 ml./hr. Collect 200 ml. fractions. Monitor the column by disc testing each fraction against *S. aureus* and *E. coli*. Chromatograph the active fractions on silicic acid thin layer plates run for 1.5 hours in the same solvent system used for the column. Combine fractions according to their chromatographic patterns as determined by the two methods previously described (see Chemical Characterization of Antibiotic W847 Complex). Concentrate the fractions under vacuum. By combining fractions as indicated in Table 14 below, Antibiotic W847 Fraction $C_2$ Hydrochloride is isolated as a white powder by dissolving the combined residues in one volume of methanol and precipitating with 10 volumes of ethyl ether. This material at this stage has a potency of about 1000 mcg./mg. in the cylinder cup assay previously described.

Isolation of Antibiotic W847 Fraction $C_2$ Material

By combining later fractions as indicated in Table 14 below, an Antibiotic W847 Fraction $C_1$ isolate is obtained as a white powder by concentrating the selected column fractions to dryness. At this stage, this material exhibits a potency of about 900 mcg./mg. in the cylinder cup assay previously described. The remaining active material is eluted from the column, pooled and concentrated to a residue.

EXAMPLE 7

Isolation of Antibiotic W847 Fraction A and Fraction B

Activate 500 g. of Florisil at 100° C. for 16 hours; fix in hexane and slurry into a glass column (105 cm. long; 3.8 cm. diameter; hold-up volume 700 ml.). Charge the column with 2.8 g. of the residue from Example 6, dissolved in 10 ml. of methylene chloride. Elute the column progressively with 700 ml. of hexane, 700 ml. of ether, 700 ml. of ethyl acetate and increasing amounts of acetone in ethyl acetate (flow rate 200 ml./hr.). Collect 100 ml. fractions. The column is monitored as previously described by testing fractions against *S. aureus* and *E. coli* followed by thin layer chromatography. Combine the fractions as indicated in Table 14 below.

TABLE 14.—RESULTS OF COLUMN SEPARATIONS

| Fraction | Column cut | Weight | Thin layer pattern $R_f$ chloroform-methanol (60/40) | Potency (mcg./mg.) |
| --- | --- | --- | --- | --- |
| Silicic acid column: | | | | |
| W847$C_2$.HCl | 28–48 | 1.2 g | 0.65 | 900–1,000 |
| W847$C_2$ | 56–58 | 625 mg | 0.52 | 850–1,000 |
| Florisil colum: | | | | |
| W847B | 164–227 (30% acetone in ethyl acetate) | 540 mg | 0.38 | 125–175 |
| W867A | 370–397 (80% acetone in ethyl acetate) | 283 mg | 0.19 | 50–100 |

EXAMPLE 8

Antibiotic W847 Complex Hydrochloride Salt

Suspend about 140 mg. of Antibiotic W847 Complex, as isolated in Example 5 above, in about 50 ml. of water. Adjust the pH of the suspension to about 6.5 to 7.0 by the addition of dilute (1 N) hydrochloric acid and stir vigorously. Remove the insolubles, if any remain, by filtration and lyophilize the filtrate to obtain an Antibiotic W847 hydrochloride weighing approximately 90 mgs. and assaying about 550 mcg./mg.

By the utilization of substantially the procedure of this example on either the Antibiotic W847 Complex or the various fractions thereof and by substituting equivalent quantities of such acids as sulfuric, phosphoric and the like, their respective acid addition salts may also be prepared. Applicants consider all such salts to be the full equivalent of the antibiotics described herein and to fall within the scope of their invention.

Table 15 below sets forth the activity of the hydrochloride, sulfate and phosphate salts of Antibiotic W847 Complex against a variety of gram-positive and gram-negative organisms.

TABLE 15.—ANTIBACTERIAL SPECTRUM OF ACID ADDITION WATER SOLUBLE SALTS OF ANTIBIOTIC W847 COMPLEX

| | Minimum inhibitory concentration (mcg./ml.) | | |
| --- | --- | --- | --- |
| Microorganism | Hydrochloride salt | Sulfate salt | Phosphate salt |
| *Bacillus subtilis* ATCC 6633 | 0.01 | 0.01 | 0.01 |
| *Staphylococcus aureus* ATCC 6538P | 0.1 | 0.01 | 0.1 |
| *Staphylococcus aureus* ATCC 11163 | 0.1 | 0.1 | 0.1 |
| *Sarcina lutea* ATCC 9341 | 0.001 | 0.001 | 0.001 |
| *Streptococcus faecalis* ATCC 10541 | 0.1 | 0.1 | 0.1 |
| *Escherichia coli* ATCC 10536 | 2.8 | 2.8 | 2.8 |
| *Klebsiella pneumoniae* ATCC 10031 | 1.4 | 1.4 | 2.8 |
| *Proteus vulgaris* DA 121 | 5.6 | 11.1 | 11.1 |
| *Pseudomonas aeruginosa* ATCC 8689 | 1.4 | 1.4 | 1.4 |
| *Salmonella schottmuelleri* DA 10 | 1.4 | 2.8 | 2.8 |

NOTE.—Medium=yeast beef broth pH 8.0. Salts made from antibiotic W847 complex with a potency of 232 mcg./mg.

EXAMPLE 9

Isolation of Antibiotic W847–C Complex

Dissolve 542 grams of W847 Complex (see Example 5) in 5.4 liters of acetone and treat the resulting solution with 81 grams of decolorizing carbon for about 30 minutes at about room temperature. Remove the decolorizing carbon by filtration and concentrate the filtrate in vacuo to approximately 2.0 liters. Prepare a slurry of about 80 liters of ice and water and with vigorous stirring add the acetone solution. Allow the temperature of the resulting suspension to rise to about 25° C. with stirring and collect the product by filtration. Wash the solids with a small quantity of water and dry at about 50° C. in vacuo to yield about 212 grams of Antibiotic W847–C complex assaying about 1075 mcg./mg.

Additional product (about 85 grams) may be obtained by concentration of the mother liquor, however, this product may be contaminated with Fractions A and B.

Antibiotic W847–C Complex as prepared above may advantageously be used in the preparation of acid addition salts as shown below.

EXAMPLE 10

Preparation of a Tartrate Salt of An Antibiotic W847–C Complex

To a solid composition comprising 2.0 g. of a complex of Antibiotic W847–$C_1$ and Antibiotic W847–$C_2$, obtained in Example 9 above, add 30 ml. of diethyl ether with stirring. Add to the resulting solution 0.5 g. of tartaric acid dissolved in 2.5 ml. of ethanol. Stir the mixture for about 15 minutes, then filter the precipitated salt. Wash the precipitate with diethyl ether and dry the product to obtain about 2.0 g. of tartrate salt whose bioassay is about 575 mcg./mg. and whose rotation is (−57°) concentration 1% in ethanol.

EXAMPLE 11

Antibiotic W847–C Complex Propionate

Dissolve 1.0 g. of Atibiotic W847–C Complex in 5.0 ml. of dry acetone and add 0.35 ml. of propionic anhydride. Stir the mixture at room temperature for 4 hours, then slowly and with stirring add 8 ml. of 1.2% ammonium hyddoxide solution. Filter the resulting precipitate and wash with 40% aqueous acetone, then with water to obtain the desired product. The product obtained in this manner has the following constants: m.p. 207°–210° C.; $[\alpha]_D^{25°} = -63°$ (C=1) ethanol.

EXAMPLE 12

Antibiotic W847–C Complex Diacetate

Dissolve 11.0 g. of W847–C Complex in 55 ml. of pyridine and add 5.5 ml. of acetic anhydride. Stir the reaction mixture at room temperature for about 18 hours, then pour it into 2.0 l. of ice water containing 50 ml. of 14% ammonium hydroxide with vigorous stirring. Filter the resulting precipitate, wash with water and dry to yield the desired product melting 237°–241° C. and having a rotation of about −86° C=1 in ethanol.

Alternatively, the precipitated product may be extracted with ethyl acetate, the extract washed with water and evaporated in vacuo to a residue. The residue is subsequently dissolved in acetone, treated with decolorizing carbon and precipitated by the addition of an equal volume of water to yield the product of this example.

EXAMPLE 13

Antibiotic W847–$C_1$ Diacetate

Dissolve 10.0 g. of Antibiotic W847–$C_1$ in 50 ml. of pyridine; add 5.0 ml. of acetic anhydride and keep the mixture at room temperature for about 18 hours. Pour the solution into 2 liters of ice water and add 50 ml. of 14% ammonium hydroxide. Filter the resulting suspension, wash the precipitate with water and dry. Crystallize the precipitate from aqueous acetone, treating with decolorizing carbon if needed, to obtain the title product, m.p. 240°–243° C., $[\alpha]_D^{25°} = -86°$ (C=1, ethanol).

EXAMPLE 14

Antibiotic W847–$C_2$ Dipropionate

Dissolve 10.0 g. of Antibiotic W847–$C_2$ in 50 ml. of pyridine; add 5.0 ml. of propionic anhydride and hold the resulting solution at room temperature for about 18 hours. Pour the solution into 2 liters of ice water and add 50 ml. of 14% ammonium hydroxide. Extract the product with methylene chloride and wash the extract with water. Concentrate the extract to a residue and crystallize the residue from aqueous acetone to obtain the product of this example, m.p. 174°–77° C., $[\alpha]_D^{25°} = -84°$ (C=1, ethanol).

EXAMPLE 15

Antibiotic W847–B Diacetate

Dissolve 5.0 g. of Antibiotic W847–B in 25 ml. of pyridine; add 2.5 ml. of acettic anhydride and hold the resulting solution at room temperature for about 18 hours. Concentrate the pyridine solution in vacuo below about 40° C. Dissolve the residue in acetone and dilute the acetone solution with 5% ammonium hydroxide to yield the title product as a crystalline suspension. Filter the suspension and wash. If desired, the product may be recrystallized from aqueous acetone to yield Antibiotic W847–B Diacetate, m.p. 198°–210° C., $[\alpha]_D^{25°} = -79°$ (C=1, ethanol).

EXAMPLE 16

Antibiotic W847–A Tripropionate

Dissolve 10.0 g. of Antibiotic W847–A in 200 ml. of pyridine; add 20.0 ml. of propionic anhydride and hold the mixture at room temperature for about 18 hours. By the isolation method of Example 15, there is obtained the product of this example, m.p. 177°–179° C., $$[\alpha]_D^{20°} = -77°$$

(ethanol).

EXAMPLE 17

Antibiotic W847–A Diproprionate.

To a solution of 1.0 g. of Antibiotic W847–A, add 0.5 ml. of propionic anhydride. Stir the solution at room temperature for 24 hours, then dilute with 1.2% ammonium hydroxide with stirring. Filter the resulting suspension, wash with dilute aqueous acetone then with water and dry. Crystallize from aqueous acetone to obtain the compound of this example, m.p. 102°–108° C., $$[\alpha]_D^{20°} = -72°$$

(C=1, ethanol).

EXAMPLE 18

Antibiotic W847–A Dibenzoate

Suspend 250 mg. of Antibiotic W847–A and 150 mg. of sodium bicarbonate in 4 ml. of acetone. Add 90 mg. of benzoyl chloride and stir the mixture at room temperature for about 4 hours and filter the mixture. Concentrate the filtrate under reduced pressure to a residue. Dissolve the residue in about 5 ml. of acetone and dilute slowly with 5% ammonium hydroxide. Filter the resulting precipitate, wash with water and dry to obtain the product of this example, m.p. 222°–225° C.

EXAMPLE 19

Antibiotic W847–A Tribenzoate

Dissolve 250 mg. of Antibiotic W847–A in 5 ml. of pyridine and add 0.14 ml. of benzoyl chloride with stirring. Keep the solution at room temperature overnight, then concentrate under reduced pressure to about 1 ml.

and dilute with about 5 ml. of acetone. Add 5% ammonium hydroxide until the product precipitates. Filter the suspension, wash the precipitate with water and dry to obtain the product of this example, m.p. 144°–149° C.

EXAMPLE 20

Antibiotic W847–C₁ Dibenzoate

Esterify Antibiotic W847–$C_1$ with benzoyl chloride according to the procedure of Example 18. Isolate the product as described and obtain the title product, m.p. 166°–169° C.

EXAMPLE 21

Antibiotic W847–A Triacetate

To a esolution of 10.0 g. of megalomicin-A (from Example 7) in 200 ml. of pyridine add 20.0 ml. of acetic anhydride and keep the reaction mixture at room temperature for 18 hours. Work up the reaction mixture according to the procedure described in Example 13. Crystallize the product from aqueous acetone to obtain the compound of this example, m.p. 199°–202° C., $[\alpha]_D^{25°} = -86°$ (C=1, ethanol).

By substituting an equivalent quantity of isovaleric anhydride for the acetic anhydride in the preceding example and by following the procedure of said example, Antibiotic W847–A tri-isovalerate is obtained.

Similarly, by substituting an equivalent quantity of stearoyl chloride for the acetic anhydride in Example 21 and by following the procedure of said example, Antibiotic W847–A tristearate is obtained.

EXAMPLE 22

Antibiotic W847–A Triacetate Lauryl Sulfate

Dissolve 250 mg. of Antibiotic W847–A triacetate, from the preceding example, in 3 ml. of acetone and add a solution of sodium lauryl sulfate in 3 ml. of water. Add with stirring a mixture of 0.03 ml. of acetic acid and 0.2 ml. of water. Dilute the mixture to a volume of 30 ml. with water and refrigerate overnight. Decant the supernatent and dissolve the waxy residue in acetone. Pour the acetone solution into ether, filter the resulting suspension and dry the precipitate at room temperature to obtain the compound of this example, m.p. 135–40° C.

EXAMPLE 23

*Megalomicin*-A Hemisuccinate

To 1.0 g. of *megalomicin*-A in 20 ml. of acetone add 228 mg. of succinic anhydride. Heat the mixture to boiling and remove any insoluble material by filtration. Heat the filtrate briefly at reflux, then allow to stand at room temperature for 18 hours. Dissolve the oily precipitate by warming the mixture, concentrate to one half volume, add a small amount of methanol and pour slowly with agitation into 200 ml. of ether. Filter the resulting precipitate, wash with ether and dry to obtain a product which TLC and bioautography shows to consist of two active components. Separate by chromatography on silica gel to obtain *megalomicin*-A di-hemisuccinate, m.p. 163°–166° C. and *megalomicin*-A tri-hemisuccinate, m.p. 165°–167° C.

In view of the foregoing examples, it is apparent that the antibiotics of this invention will form esters with a host of other acyl residues and applicants consider all such esters to be the full equivalent of those whose preparation is described herein.

The following examples are directed to some of the pharmaceutical dosage forms wherein the antibiotics may be used. The formulations, excluding the topicals, are designed to permit the administration of from about 5 to about 50 mg. of antibiotic per kilogram of body weight per day. It is contemplated that the medicaments be given in doses up to 8 times in a 24 hour period.

The topical formulations are generally applied to the infected area from 2 to 4 times daily.

In the utilization of the formulations set forth below the dosage of antibiotic given and the frequency of administration depends in large part of the stage and severity of the infection, the type of infection and the individual characteristics of the animal species being treated.

EXAMPLE 24

Capsule

|  | Mg. |
|---|---|
| Antibiotic W847 Complex | 250.00 |
| Lactose | 248.75 |
| Magnesium stearate | 1.25 |
|  | 500.00 |

Procedure

1. Blend the Antibiotic W847 Complex and the lactose.
2. Add the magnesium stearate and mix.
3. Fill capsules.

EXAMPLE 25

Oral Suspension (to give a close of 125 mg. per 5 ml.)

|  | Gm. |
|---|---|
| Antibiotic W847–A | 25.0 |
| Magnesium aluminum silicate | 9.5 |
| Sodium Carboxymethylcellulose, U.S.P. | 2.5 |
| Sodium Citrate, U.S.P. | 25.0 |
| Flavor | Q.s. |
| Color | Q.s. |
| Methylparaben, U.S.P. | 0.9 |
| Propylparaben, U.S.P. | 0.2 |
| Polysorbate 80, U.S.P. | 1.0 |
| Sorbitol Solution, U.S.P. | 500.0 |
| Water, q.s., 1000.0 ml. |  |

Procedure

1. Heat 200 ml. of water to boiling, and dissolve in it one half of the parabens. Cool to about 70° C., then mix in the Polysorbate 80. Sprinkle in the silicate, stirring until a uniform smooth suspension results.
2. Heat an additional 200 ml. of water to boiling, and dissolved in it the remainder of the parabens. Disperse the CMC in this until a smooth gel results. Mix in the sorbitol Solution. Then dissolve the sodium citrate.
3. Add 2 to 1 slowly, with constant stirring. Cool the mixture to 25° C. Add the Antibiotic W847A, flavor and color, mixing throughly. Add sufficiently quantity of water to make the total volume 1000 ml.

EXAMPLE 26

Topical Cream

|  | Gm. |
|---|---|
| Antibiotic W847B | 10 |
| Stearic acid | 200 |
| Sorbitan monostearate | 104 |
| Sorbitan monoleate | 20 |
| Polyoxyethylene sorbitan monolaurate | 56 |
| Water, q.s. | 1000 |

Procedure

1. Heat the stearic acid, sorbitan monostearate, sorbitan monooleate, and polyoxyethylene sorbitan monolaurate to 65° C.
2. Heat about 90% of the water to 70° C.
3. Add the water to Step 1 and mix to form the cream base.
4. Slurry the Antibiotic W847B with about 10% of the water and pass through a colloid mill.
5. Add the milled slurry to the molten base and mix. Allow to cool.

EXAMPLE 27

Topical Ointment

| | Gm. |
|---|---|
| Antibiotic W847–$C_1$ | 10 |
| Petrolatum | 990 |
| | 1000 |

Procedure

1. Melt the petrolatum.
2. Slurry the Antibiotic W847$C_1$ with about 10% of the petrolatum and pass through a colloid mill.
3. Mix the milled slurry with the remainder of the molten petrolatum. Allow to cool.

EXAMPLE 28

Parenteral Suspension

| | Mg. |
|---|---|
| Antibiotic W847–$C_2$ | 250 |
| Sodium carboxymethylcellulose | 3 |
| Polysorbate 80 USP | 1 |
| Methylparaben | 3.6 |
| Propylparaben | 0.4 |
| Water, q.s., 2.0 ml. | |

Procedure

1. Prepare a solution of sodium carboxymethylcellulose, Polysorbate 80, USP, methylparaben, and propylparaben. Autoclave the solution.
2. Aseptically, slurry sterile Antibiotic W847–$C_2$ with a portion of the above vehicle and pass through a colloid mill.
3. Mix the milled slurry with the remainder of the vehicle.
4. Fill into sterile vials.

We claim:

1. A non-toxic hydrocarbon carboxylic acid ester of a compound selected from the group having the formula:

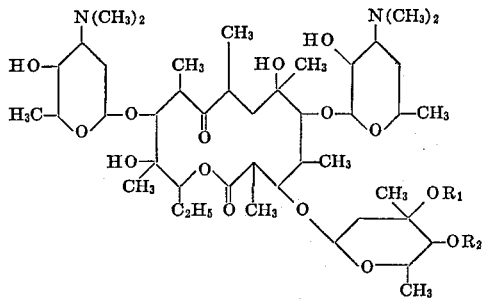

including the non-toxic pharmaceutically acceptable acid addition salts thereof, wherein $R_1$ and $R_2$, respectively, are selected from the group consisting of ($R_1$=H, $R_2$=H) in megalomicin A; ($R_1$=H, $R_2$=acetyl) in megalomicin B; ($R_1$=acetyl, $R_2$=acetyl) in megalomicin $C_1$; and ($R_1$=acetyl, $R_2$=propionyl) in megalomicin $C_2$.

2. A composition of matter as defined in claim 1, said composition being a non-toxic pharmaceutically acceptable hydrocarbon carboxylic acid ester of megalomicin A and the non-toxic pharmaceutically acceptable acid addition salts of said ester.

3. A composition of matter as defined in claim 1, said composition being a non-toxic pharmaceutically acceptable hydrocarbon carboxylic acid ester of megalomicin B and the non-toxic pharmaceutically acceptable acid addition salts of said esters.

4. A composition of matter as defined in claim 1, said composition being a non-toxic pharmaceutically acceptable hydrocarbon carboxylic acid ester of megalomicin $C_1$ and the non-toxic pharmaceutically acceptable acid addition salts of said ester.

5. A composition of matter as defined in claim 1, said composition being a non-toxic pharmaceutically acceptable hydrocarbon carboxylic acid ester of megalomicin $C_2$ and the non-toxic pharmaceutically acceptable acid addition salts of said ester.

6. A composition of matter as defined in claim 1, said composition being a non-toxic pharmaceutically acceptable hydrocarbon carboxylic acid ester of megalomicin C complex and the non-toxic pharmaceutically acceptable acid addition salts of said ester, said complex consisting of megalomicin $C_1$ and megalomicin $C_2$.

7. A compound of claim 2, said compound being megalomicin A dipropionate.

8. A compound of claim 2, said compound being megalomicin A tripropionate.

9. A compound of claim 2 said compound being megalomicin A dibenzoate.

10. A compound of claim 2 said compound being megalomicin A tribenzoate.

11. A compound of claim 2, said compound being magalomicin A triacetate.

12. A compound of claim 2, said compound being megalomicin A triacetate lauryl sulfate.

13. A compound of claim 2, said compound being megalomicin A dihemisuccinate.

14. A compound of claim 2, said compound being megalomicin A trihemisuccinate.

15. A compound of claim 3, said compound being megalomicin B diacetate.

16. A compound of claim 4, said compound being megalomicin $C_1$ diacetate.

17. A compound of claim 4, said compound being megalomicin $C_1$ dibenzoate.

18. A compound of claim 5, said compound being megalomicin $C_2$ dipropionate.

19. A compound of claim 6, said compound being megalomicin C complex propionate.

20. A compound of claim 6, said compound being megalomicin C complex diacetate.

References Cited

UNITED STATES PATENTS

| 3,634,393 | 1/1972 | Motola | 260—210 AB |
| 3,669,953 | 6/1972 | Mallams | 260—210 AB |

JOHNNIE R. BROWN, Primary Examiner

U.S. Cl. X.R.

195—31

UNITED STATES PATENT OFFICE
CERTIFICATE OF CORRECTION

PATENT NO. : 3,819,611

DATED : June 25, 1974

INVENTOR(S) : Marvin J. Weinstein, Gerald H. Wagman, George M. Luedemann and Joseph A. Marquez It is certified that error appears in the above-identified patent and that said Letters Patent are hereby corrected as shown below:

Column 1, line 25 "indivdual" should read --individual--.
Column 4, line 6 "800 meg/ml" should read --800 mcg/ml--.
Column 4, line 43 "Dry Ice" should read --dry ice--.
Column 6, Table 4 "Crythromycin" should read --erythromycin--.
Column 6, line 23 "Antiobotic" should read --Antibiotic--.
Column 6, line 40 "ethyl acetate, methanol and acetone" should read --ethyl acetate, methanol, ethanol and acetone--. Column 6, line 64 "hereinafter as" should read --hereafter as--.
Column 7, line 28 "from the solumn described above" should read --from the column described above--. Column 9, Table 6 "(1)" should read --(instrument artifact)--. Column 9, Table 6 under Fraction $C_2$ "(1)" should read --(instrument artifact)--.
Column 10, Table 7 under Fraction B "9.5" should read --0.5--.
Column 10, Table 7 under Fraction B "0.05" should read --0.005--.
Column 10, Table 7 under C-complex "0.'0075" should read --0.00075--. Column 11, Table 8 under complex "0.03-022" should read --0.03-0.22--. Column 13, line 7 "erythromycin in Table 10" should read --erythromycin in Table 10 below--.
Column 13, Table 12 "S.C." should read --S.C.'--. Column 16, line 15 "Micromonospora sp (W847" should read --Micromonospora sp W847--. Column 17, Table 14 "W867A" should read --W847B--.
Column 19, line 45 "hyddoxide" should read --hydroxide--.
Column 22, line 45 "dissolved in it" should read --dissolve in it--. Column 22, line 50 "add sufficiently" should read --add sufficient--.

Signed and Sealed this ninth Day of December 1975

[SEAL]

Attest:

RUTH C. MASON
Attesting Officer

C. MARSHALL DANN
Commissioner of Patents and Trademarks